United States Patent
Wang et al.

(10) Patent No.: US 9,237,168 B2
(45) Date of Patent: Jan. 12, 2016

(54) TRANSPORT LAYER SECURITY TRAFFIC CONTROL USING SERVICE NAME IDENTIFICATION

(75) Inventors: Jianxin Wang, San Jose, CA (US); Hari Shankar, San Jose, CA (US); Trevor Highland, Austin, TX (US); Niranjan Koduri, Milpitas, CA (US); Daryl Odnert, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 412 days.

(21) Appl. No.: 13/473,835

(22) Filed: May 17, 2012

(65) Prior Publication Data

US 2013/0312054 A1     Nov. 21, 2013

(51) Int. Cl.
*H04L 29/06*     (2006.01)

(52) U.S. Cl.
CPC .......... *H04L 63/166* (2013.01); *H04L 63/0236* (2013.01); *H04L 63/0428* (2013.01)

(58) Field of Classification Search
CPC . H04L 63/0823; H04L 63/164; H04L 63/166; H04L 63/20; H04L 63/102; H04L 63/0227; H04L 63/0236; H04L 63/16; H04L 63/168
USPC ......... 713/151, 168–171; 726/1, 14; 709/226, 709/223, 225, 227
See application file for complete search history.

(56) References Cited

U.S. PATENT DOCUMENTS

| | | | | |
|---|---|---|---|---|
| 7,519,834 | B1* | 4/2009 | Dondeti et al. | 713/193 |
| 7,624,142 | B2* | 11/2009 | Jungck | 709/201 |
| 8,117,335 | B2* | 2/2012 | Maes | 709/238 |
| 8,161,547 | B1* | 4/2012 | Jennings et al. | 726/22 |
| 8,190,879 | B2* | 5/2012 | Wang | 713/153 |
| 8,316,429 | B2* | 11/2012 | Long et al. | 726/12 |
| 8,327,128 | B1* | 12/2012 | Prince et al. | 713/150 |
| 8,473,744 | B2* | 6/2013 | Shelest et al. | 713/170 |
| 8,543,805 | B2* | 9/2013 | Ovsiannikov | 713/151 |
| 8,638,795 | B2* | 1/2014 | Jackowski et al. | 370/392 |
| 8,738,902 | B2* | 5/2014 | Yoo et al. | 713/156 |
| 2004/0015725 | A1* | 1/2004 | Boneh et al. | 713/201 |
| 2007/0136801 | A1 | 6/2007 | Le et al. | |
| 2008/0028443 | A1* | 1/2008 | Adelman et al. | 726/4 |
| 2008/0126794 | A1 | 5/2008 | Wang et al. | |
| 2009/0157708 | A1 | 6/2009 | Bandini et al. | |
| 2010/0306816 | A1 | 12/2010 | McGrew et al. | |
| 2011/0289581 | A1 | 11/2011 | Gourevitch et al. | |
| 2012/0084423 | A1 | 4/2012 | McGleenon | |

OTHER PUBLICATIONS

International Search Report and Written Opinion in counterpart International application No. PCT/US2013/041097, mailed Aug. 28, 2013, 11 pages.

* cited by examiner

*Primary Examiner* — Nirav B Patel
(74) *Attorney, Agent, or Firm* — Edell, Shapiro & Finnan, LLC

(57) ABSTRACT

Traffic control techniques are provided for intercepting an initial message in a handshaking procedure for a secure communication between a first device and a second device at a proxy device. Identification information associated with the second device is extracted from the initial message. A policy is applied to communications between the first device and second device based on the identification information.

16 Claims, 8 Drawing Sheets

TRANSPORT LAYER SECURITY TRAFFIC CONTROL USING SERVICE NAME IDENTIFICATION

TECHNICAL FIELD

The present disclosure relates generally to computer networks, and more particularly, to communications between two network nodes.

BACKGROUND

Generally, modern networks are set up with proxy devices, such as firewalls, to apply policy decisions to the traffic that flows across a network boundary. In order to apply these policy decisions, the firewalls may inspect the network traffic, making a shallow inspection by only viewing packet headers, or performing deep packet inspection by viewing the underlying packet data. With unsecured network transmissions it is possible for the firewalls to immediately view the network packets in their entirety, and therefore, the firewalls are able to apply policy decisions to network traffic prior to allowing any portion of the messages through the firewall.

As more network traffic is being sent securely (e.g., using encryption techniques), it is no longer possible for the firewall to view the network traffic in its entirety without first decrypting the messages. Additionally, in certain encryption protocols, a firewall is not be able to determine even basic information, such as the desired uniform resource locator (URL) for the message, without decrypting the message. In order to complete the decryption process, the firewall will often need to allow certain messages or a limited number of packets, for example, to pass through the firewall before any policy decision is applied to the traffic. Decryption of network traffic at the firewall requires resource intensive operations to be performed by the firewall. Furthermore, since networks are used for carrying traffic for sensitive transactions such as financial transactions, rules and regulations are being put into place which restrict firewalls from decrypting certain sensitive traffic.

DESCRIPTION OF EXAMPLE EMBODIMENTS

Overview

According to the techniques described herein, a handshaking procedure for a secure communication between a first device and a second device is intercepted at a proxy device. Identification information associated with the second device is extracted from an initial message of the handshaking procedure. A policy is applied to communications between the first device and second device based on the identification information.

Example Embodiments

Figure 1:
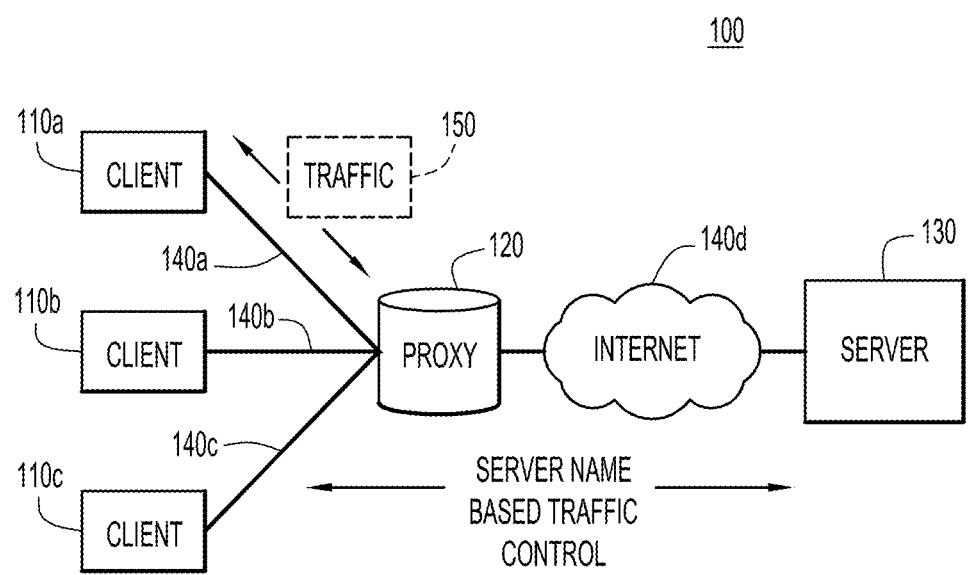
FIG. 1 illustrates an example computer network in which a proxy device is configured for Transport Layer Security (TLS) traffic control using service name identification information.

Reference is first made to FIG. 1. FIG. 1 is a block diagram of an example computer network 100. The network 100 comprises client nodes 110a-c, a proxy device 120, and a server 130. For simplicity, reference numeral 110 is used to refer generally to any of the clients 110a-c. Interconnecting the network devices are links 140a-d. For simplicity, each of the client nodes are referred to here as a "client" and the proxy device 120 is referred to herein as a "proxy". The clients may take on a variety of forms. For example, the clients 110a-c may be Internet Protocol (IP) phones, laptop computers, tablet computers, desktop computers, Smartphones, server computers, etc. The clients 110a-c may be equipped with web browsers that are capable of accessing web content via the Internet, for example. The proxy device 120 may be a firewall device that resides at a network boundary or edge to a local area network of a business enterprise. The server 130 may be a web server hosting web services for applications such as Internet banking, other web service applications, or other web content. The links 140a-c between the clients 110a-c and the proxy device 120 may be network communication links embodied as copper wires, optical fibers, wireless channels, and other links (and any combination thereof) now known or hereinafter developed. The cloud 140d is meant to represent the Internet, which itself may involve a combination of wired and wireless links, over which the communication occurs between the clients 110a-c and the server 130.

Traffic 150 maybe sent between network devices using communication protocols such as the Transmission Control Protocol/Internet Protocol (TCP/IP), User Datagram Protocol (UDP), Asynchronous Transfer Mode (ATM) protocol, Frame Relay Protocol, Internet Packet Exchange (IPX) protocol, and other protocols now known or hereinafter developed.

As indicated in FIG. 1, examples of server name based traffic control can be implemented at proxy 120 in order to, for example, apply policy decisions to traffic between clients 110a-c and server 130. The policy decisions implemented at the proxy 120 may be configured by the owner or administrator of the proxy 120. For example, the administrator may determine a list of policies that should be applied to the traffic that is intercepted by proxy 120. Accordingly, an example proxy 120 may, through a software or hardware module, determine when and how to implement the policy decisions.

Examples of server name based traffic control implementations may include intercepting at a proxy 120 traffic 150 that includes or has associated therewith a handshaking procedure for a secure communication between a client 110 and a server 130. Identification information associated with the server 130 is extracted from an initial message of the handshaking procedure. A policy is applied to communications between the client 110 and the server 130 based on the identification information.

Figure 2:
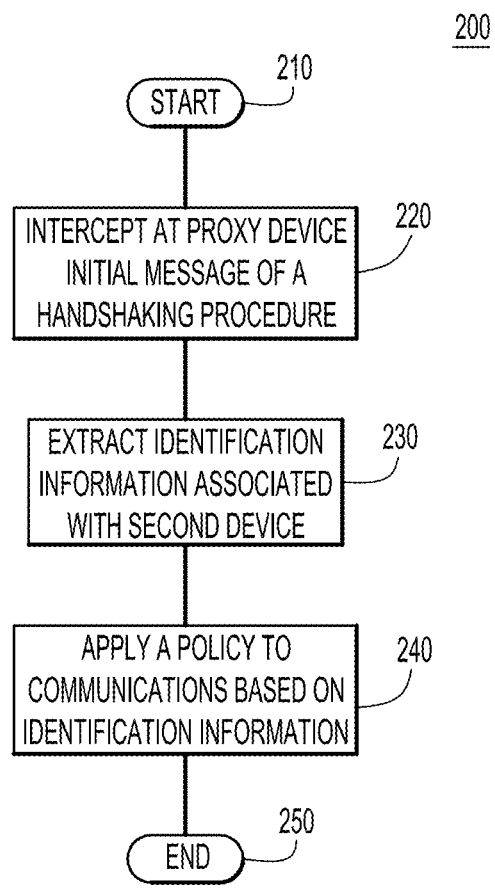
FIG. 2 is a flow chart that illustrates an example procedure performed at the proxy device for applying a policy to communications between a first device and a second device across a network.

FIG. 2 illustrates a flow chart for a procedure 200 that the proxy 120 uses for applying policy decisions to traffic 150 in accordance with one or more example embodiments herein. The procedure 200 starts at step 210, and continues to step 220 where, at the proxy device 120, an initial message of a handshaking procedure between a first device (e.g., a client) and a second device (e.g., a server) is intercepted. Examples of a handshaking procedure may include message exchanges that dynamically set parameters of a communication channel established between two entities before normal communication over the channel begins. Handshaking procedures are used to establish security parameters for a secure (i.e., encrypted) communication session between the first device and second device.

Upon intercepting the initial message of the handshaking procedure, the procedure continues to step 230 in which the proxy device 120 extracts from the initial message identification information associated with the server 130. According to example embodiments, the identification information can take different forms. In one example, the initial message of the handshaking procedure comprises a "ClientHello" message of the Transport Layer Security (TLS) handshaking procedure. According to this example, the proxy device 120 may extract the Server Name Indication (SNI) extension from the ClientHello message. As discussed in more detail below, the SNI is generally not used for security purposes or to apply policy decisions, but instead is used to distinguish between multiple Domain Name System (DNS) hostnames that are virtually hosted on a single server.

Based on the identification information extracted in step 230, the proxy device 120 applies a policy to the communications in step 240. According to different examples, the basis for the application of the policy decision can take many forms. According to one example, the identification information may identify the server 130 by name, and the policy decision may be applied based on the name of the server 130. For example, the identification information may be compared against a "blacklist" database of servers to which connections should be blocked. Accordingly, the proxy device 120 would block all further communications between the client device, e.g., client device 110a, and the server 130.

According to other examples, the identification information may be indicative of an application type for traffic for a communication session between the client and server. For example, the identification information may indicate that the data to be used for a banking or other financial services operation. Other examples of applications may include Voice over IP (VoIP) applications, streaming video, social networking, photosharing, and other applications known to those skilled in the art.

In still other forms, the application of the policy may be based on the reputation of the server 130. Reputation information associated with servers is accumulated over time from communication sessions between clients and servers. For example, the identification information may indicate that the particular server that the client is attempting to connect to has a reputation of, for example, hosting spyware or malware. Accordingly, the proxy 120 may apply a policy decision that is different than the policy decision that would be applied to a server 130 that has a benign reputation.

According to yet other examples, the application of the policy decision may be based on the category of the server 130 or the content served by the server 130. Examples of categories may include education, entertainment, financial data and services, gambling, games, government, illegal or questionable material, news and media, and other categories known to those skilled in the art. Some categories of servers may be readily allowed while others are regulated or denied.

The policy decision itself can take many forms. For example, the policy decision can result in the handshaking procedure being aborted at the proxy device 120 before any messages are sent to the server 130 and certainly before any content from the server 130 reaches the client. In another example, the application of the policy decision can result in future traffic between the client 110 and server 130 passing through the proxy device 120 without any decryption and/or re-encryption taking place at the proxy device 120. In yet another example, the application of the policy decision results in future communications being decrypted at the proxy device 120 and then being re-encrypted at the proxy device 120 for transfer between the client 110 and the server 130.

The procedure 200 ends at 250.

Figure 3:
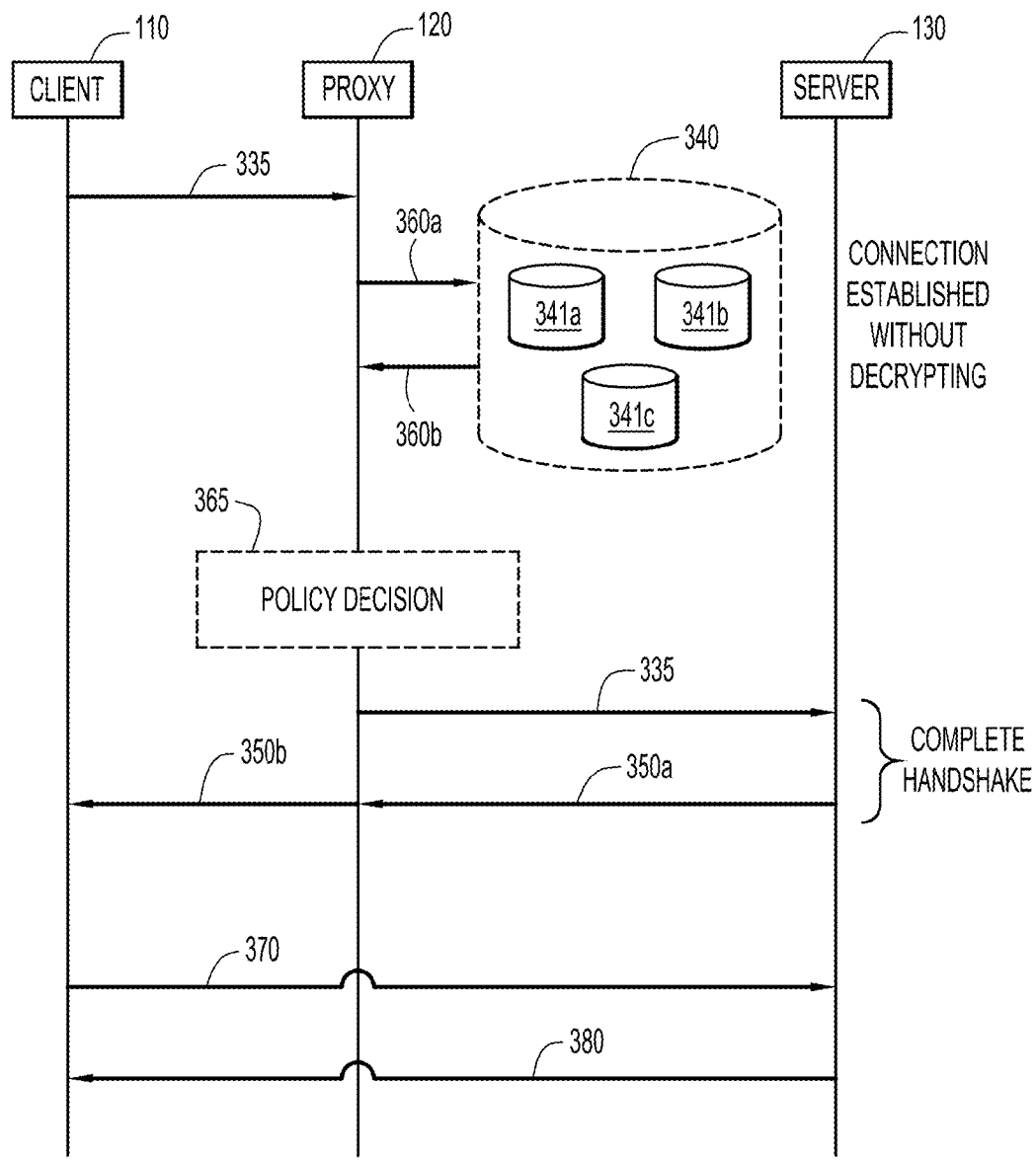
FIG. 3 is a ladder diagram that illustrates an example message exchange between a client and a server through the proxy device in which a communication session is established such that the proxy device does not decrypt the message data.

Reference is now made to FIGS. 3-7 for a more detailed description of the examples described above. FIG. 3 illustrates an example in which the application of the policy decision results in subsequent secure communications between a client 110 and a server 130 passing through a proxy 120 without decryption at the proxy 120. An initial message, e.g., a ClientHello message 335, is sent from the client 110 to initiate a handshake procedure between the client 110 and the server 130, e.g., to establish a secure communication session with the server according to the TLS protocol. The ClientHello message 335 is intercepted by the proxy device 120. The proxy device 120 extracts server identification information from the ClientHello message 335.

The proxy device 120 makes a query 360a based on the server identification information to a database 340. The database 340 may be part of the proxy device 120 or external to the proxy device 120. As depicted in FIG. 3, the database 340 may comprise multiple databases, such as a host category database 341a, reputation database 341b, and an application database 341c.

A comparison is made between the server identification information extracted from the initial message and the information stored in database 340. A result of the comparison is returned via response message 360b. Based on the results of the comparison, the proxy device 120 applies a policy decision 365 to any further communications between the client 110 and the server 130.

While some examples base the application of the policy on a comparison with a single database, other examples may apply the policy based on a combination of comparisons with two or more of the databases. For example, while a comparison with the reputation database 341b may determine whether or not the communication session should be allowed, the application database 341c may be used to determine whether or not the subsequent communications between the client 110 and the server 130 should be decrypted at the proxy 120. It may also be the case that the results of the comparisons with more than one database are balanced to determine the appropriate policy to apply. For example, financial services communications may be prohibited from being decrypted by proxy devices. Accordingly, even if a reputation or category comparison would indicate that the communication session should be decrypted at the proxy 120, the legal requirement that financial services data cannot be decrypted by the proxy 120 would result in communications continuing without decryption by the proxy 120.

As depicted in FIG. 3, the result of the comparison is that the communication session (connection) between the client 110 and the server 130 should be established. Accordingly, the proxy 120 forwards the ClientHello message 335 to the server 130. The client 110 and the server 130 complete the handshaking procedure through messages 350. Data is sent to the server via messages 370 and data is sent to the client via messages 380, which as shown in FIG. 3, bypass the proxy 120.

Figure 4:
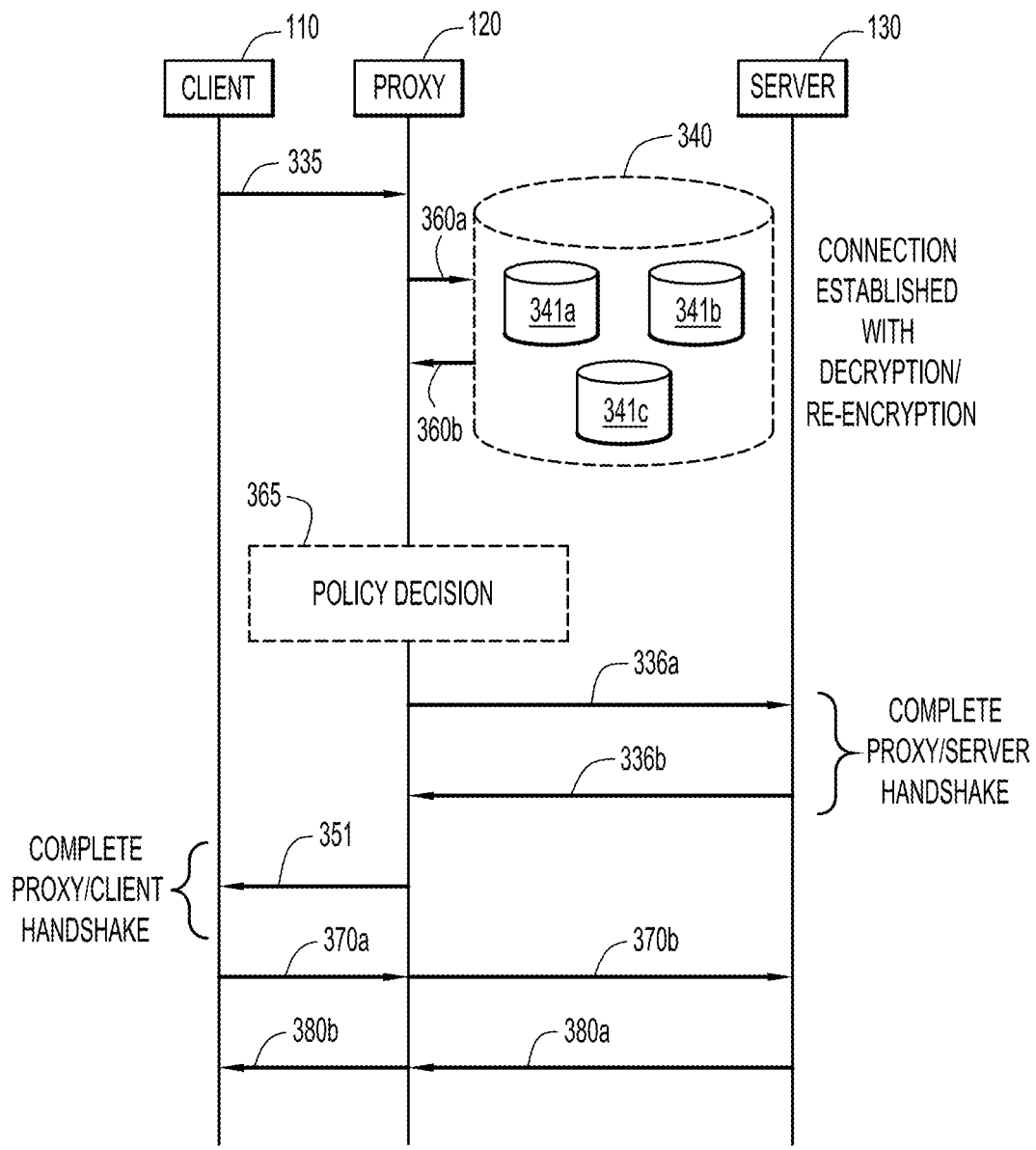
FIG. 4 is a ladder diagram that illustrates an example message exchange between a client and a server through the proxy device in which a communication session is established such that the proxy device decrypts the message data.

Reference is now made to FIG. 4. The example depicted in FIG. 4 is similar to that of FIG. 3 except that the application of the policy results in communications 370 being decrypted by proxy 120, re-encrypted, and sent to the server 130. Similarly, communication 380 from the server 130 is decrypted by the proxy 120, re-encrypted, and sent to the client 110. Because of the encryption and decryption being performed by proxy 120, the handshaking procedure may proceed in a different manner than the example procedure depicted in FIG. 3. Specifically, as shown in FIG. 4, if the result of the comparison between the server identification information and the information stored in database 340 indicates that a connection should be established, the proxy 120 will send a proxy ClientHello message 336a to initiate a handshake procedure between the proxy 120 and the server 130. When the proxy/server handshaking procedure is completed, the proxy 120 completes a proxy/client handshaking procedure through message 351. With all handshaking procedures completed, communications between the client 110 and the server 130 can be carried out with decryption and re-encryption taking place at proxy 120.

Figure 5:
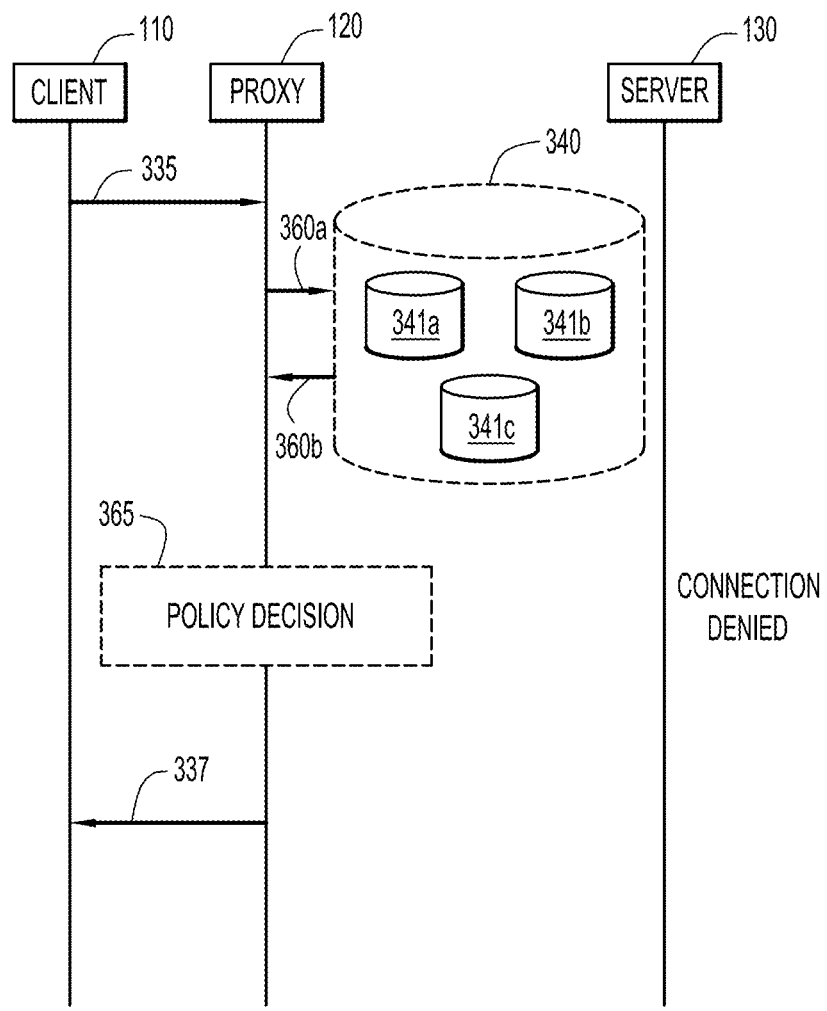
FIG. 5 is a ladder diagram that illustrates an example message exchange between a client and a server through the proxy device in which a communication session is denied by the proxy device.

Turning now to FIG. 5, an example is shown in which the application of the policy results in the denial/blocking of communications between the client 110 and the server 130. Accordingly, the ClientHello message 335 never makes it to the server 130, and a connection denial message 337 is sent from the proxy 120 to the client 110.

With regards to the examples depicted in FIGS. 3 and 4 which result in a connection between the client 110 and the server 130, the policy decision may be applied prior to any communications between the devices. Accordingly, the policy can be implemented without disrupting the handshaking procedure or the subsequent data exchanges. Additionally, the application of the policy prior to any communications between the client 110 and the server 130 may prevent any malicious or otherwise harmful communications from being sent as part of the handshaking procedure.

Figure 6:
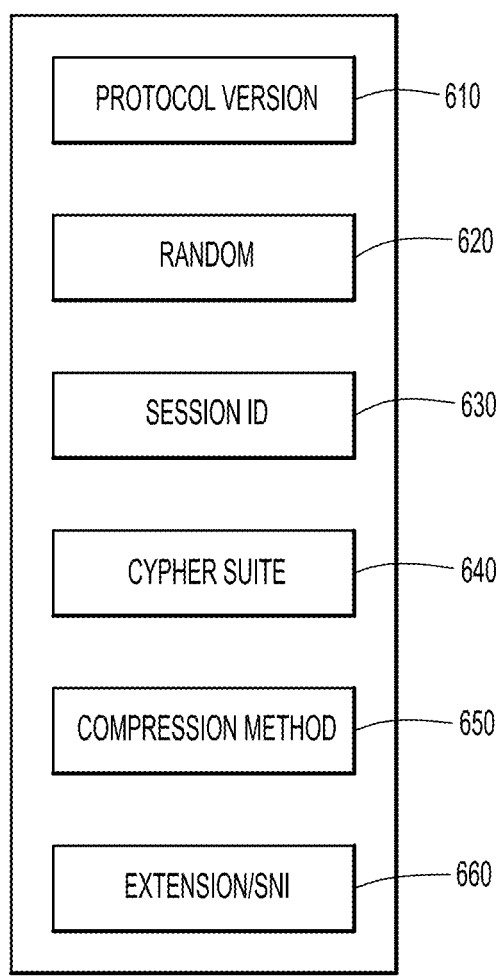
FIG. 6 illustrates an example initial message that the proxy device uses to extract server name identification information for purposes of applying a policy.
Figure 7:
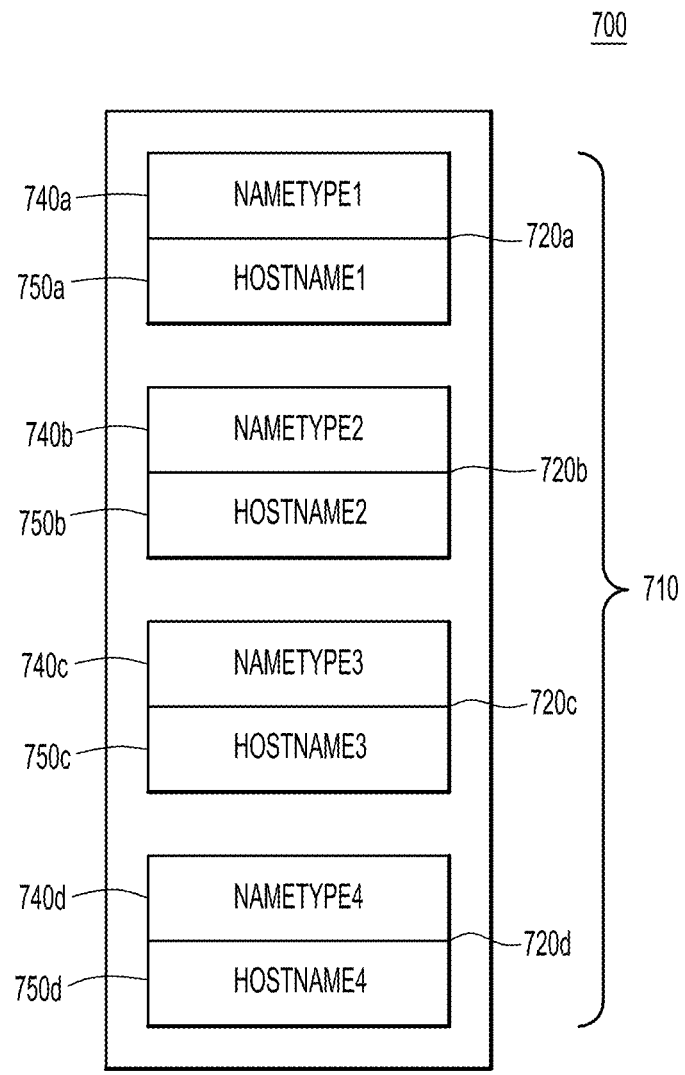
FIG. 7 illustrates an example Server Name Indication extension contained in the initial message that is analyzed by the proxy device for purposes of applying a policy.

Reference is now made to FIGS. 6 and 7. Depicted in FIG. 6 is an example of an initial message. Specifically, depicted in FIG. 6 is a ClientHello message 600 according to the TLS protocol. Included in the TLS ClientHello message 600 is a protocol version indication 610 that indicates the highest TLS protocol supported by the client, a random number 620 for use in creating a "master secret" for the encryption/decryption of the data intended to be sent, a session ID 630, useful if the message is attempting to perform a resumed handshake, an indication of a cypher suite 640, an indication of a compression method 650, and the SNI extension 660.

The SNI extension 660 was added to the TLS protocol to indicate to the server the hostname the client is attempting to connect to during the handshaking procedure. Specifically, it is present in the ClientHello message 600 to assist with name-based virtual hosting. Name-based virtual hosting allows multiple DNS hostnames to be hosted on a single server on the same IP address. In an unsecured HTTP request, the server can read the virtual host from the HTTP headers. In an encrypted TLS request, the server is unable to read the HTTP headers until after the handshaking procedure is finished. In order to present the client with the appropriate certificate, it is useful for the server to know which hostname the client is attempting to reach before completion of the handshaking procedure.

FIG. 7 illustrates an example of an SNI extension 700. The SNI extension comprises a ServerNameList 710. The ServerNameList 710 is made up of multiple entries e.g., four entries 720a-d, as an example. Each entry comprises a host name 750a-d and a name type 740a-d. For example, an example embodiment could list a number of host names 750a-d all of which may be of the DNS name type. Of course, name types other than DNS can be used with the SNI extension 700.

With reference back to FIG. 3, in an example involving the use of a TLS ClientHello message 600 and a TLS SNI extension 700, the proxy 120 extracts the SNI extension 700 from the ClientHello message 600 prior to the server 130 receiving the ClientHello message 600. The proxy 120 compares one or more of the host names 750a-d and/or name types 740a-d contained in the SNI extension 700 of the ClientHello message 600 with the information stored in database 340. A result of the comparison is returned via response message 360b. Based on the results of the comparison, the proxy device 120 applies a policy decision to any further communications between the client 110 and the server 130. As previously discussed, the policy decision in the example of FIG. 3 results in the completion of the TLS handshaking procedure, and therefore, the server 130 will still be able to read the SNI extension 700 for its intended purpose of indicating to the server 130 the host to which the client 110 is attempting to connect.

Figure 8:
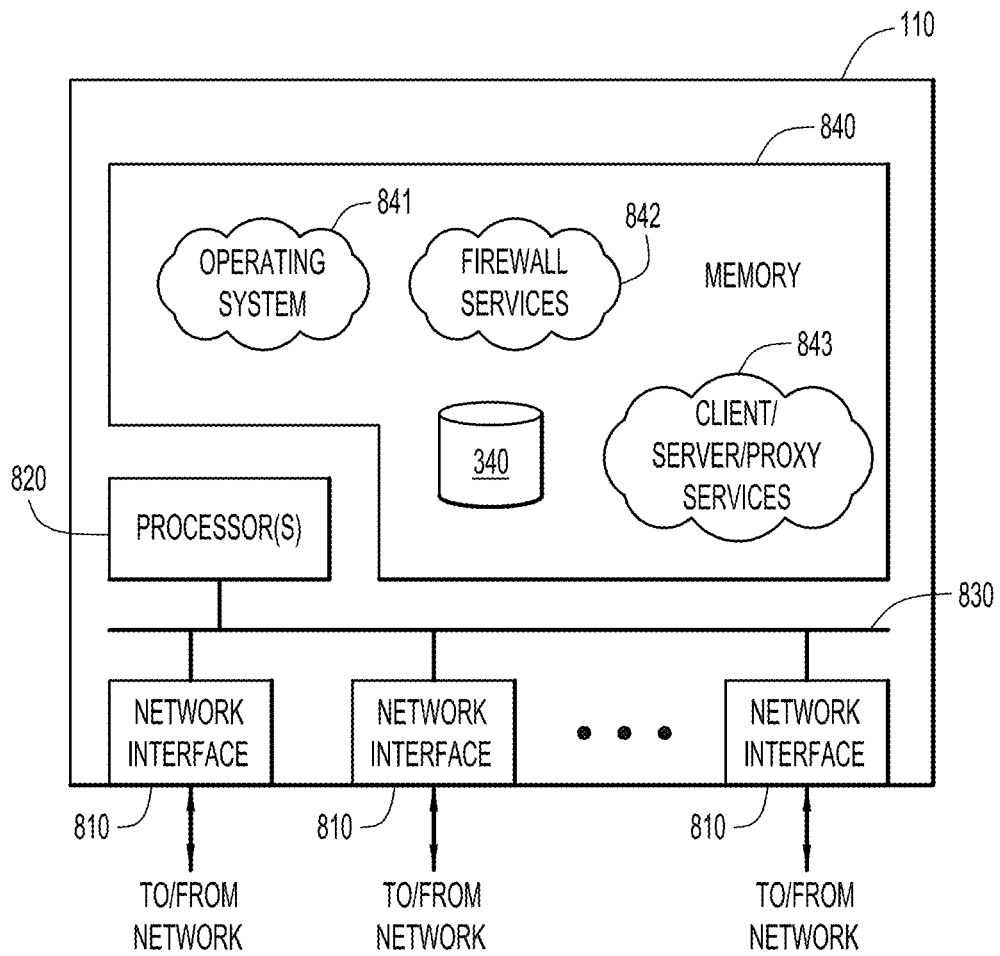
FIG. 8 is an example of a block diagram of the proxy device configured to perform TLS traffic control using server name identification information.

FIG. 8 depicts an example block diagram of a proxy device configured to perform the traffic control techniques described herein. The proxy device 120 comprises network interfaces 810, processor 820, bus 830, and memory 840. The memory 840 comprises software instructions for operating system 841, firewall services 842, and client/server proxy services 843. The memory 840 also includes database 340, but as discussed above, the database 340 may also be maintained external to the proxy device 120.

Memory 840 may comprise read only memory (ROM), random access memory (RAM), magnetic disk storage media devices, optical storage media devices, flash memory devices, electrical, optical, or other physical/tangible (e.g., non-transitory) memory storage devices. The processor 820 is, for example, a microprocessor or microcontroller that executes instructions for the proxy device logic. Thus, in general, the memory 840 may comprise one or more tangible (non-transitory) computer readable storage media (e.g., a memory device) encoded with software comprising computer executable instructions and when the software is executed (by the processor 820), and in particular firewall services software 842, it is operable to perform the operations described herein in connection with FIGS. 2-5.

There are several advantages to the traffic control techniques described herein. For example, by intercepting the initial message of a handshaking procedure, important network resources can be conserved. As depicted in FIG. 5, the determination to block the connection between the client 110 and the server 130 is made before the message 335 makes its way to the server 130. Accordingly, the network and computational resources required to complete the handshaking procedure can be conserved. Specifically, resources used to create and store the "master secret" for encrypted communications, send and receive a ServerHello, determine and retrieve a security certificate, and exchange security keys can be conserved. In addition, the computational resources required to decrypt and re-encrypt the data can be conserved.

Furthermore, because the communication session between a client and server can be denied prior to any substantive communications between the client 110 and the server 130, resources that would otherwise be needed to terminate the established connection can be conserved.

In summary, a method, apparatus and computer readable tangible storage media are provided to perform the traffic control techniques described herein. In apparatus form, an apparatus is provided that comprises a processor, at least one network interface unit configured to transmit and receive messages over a network and a memory. The processor is configured to intercept an initial message of a handshaking procedure for a secure communication session between a first device and a second device, extract from the initial message identification information associated with the second device, and apply a policy to communications between the first device and the second device based on the identification information.

In computer readable tangible storage media form, instructions are encoded on a computer readable tangible storage media that, when executed by a processor, cause the processor to intercept at a proxy device an initial message of a handshaking procedure for a secure communication session between a first device and a second device. The instructions further cause the processor to extract from the initial message identification information associated with the second device, and to apply a policy to communications between the first device and the second device based on the identification information.

The above description is intended by way of example only.

What is claimed is:

1. A method of establishing a connection across a network, comprising:
    intercepting at a proxy device a partially encrypted initial message of a handshaking procedure for a secure encrypted communication session between a first device and a second device, wherein the initial message is a ClientHello message of a Transport Layer Security (TLS) handshaking procedure that includes identification information associated with the second device, wherein the identification information comprises a plurality of parameters including host names, categories of hosts, reputations of hosts, and application types, and wherein each parameter has assigned a weight;
    extracting from the initial message the identification information associated with the second device;
    comparing the plurality of parameters with a plurality of databases to generate comparison results;
    balancing the comparison results based on the assigned weights to the parameters to determine a policy; and
    applying the policy to communications between the first device and the second device based on the identification information,
    wherein extracting the identification information comprises extracting a server name indication extension in the initial message without decrypting the initial message, and
    wherein the service name indication extension indicates a host name of the second device.

2. The method of claim 1, wherein applying comprises comparing the identification information against stored information of devices for which communications are to be blocked, and blocking the secure communication session between the first device and second device when there is a match between the identification information and the stored information.

3. The method of claim 1, wherein applying comprises comparing the identification information against stored information of host names for devices whose traffic is allowed to be intercepted and decrypted, and further comprising decrypting communications between the first device and second device at the proxy device when there is a match between the identification information and the stored information.

4. The method of claim 1, wherein applying comprises comparing the identification information with stored information representing categories of hosts and applying a policy to permit access to the second device and/or to decrypt communications between the first device and second device based on a category for the identification information determined from the stored information.

5. The method of claim 1, wherein applying comprises comparing the identification information with stored information representing reputations of hosts and applying a policy to permit access to the second device and/or to decrypt communications between the first device and second device based on a reputation determined for the identification information from the stored information.

6. The method of claim 1, wherein applying comprises comparing the identification information with stored information representing application types associated with hosts and applying a policy to permit access to the second device and/or to decrypt communications between the first device and second device based on an application type determined for identification information from the stored information.

7. The method of claim 1, wherein applying comprises determining whether to permit communications between the first device and second device.

8. The method of claim 1, wherein applying comprises applying the policy prior to forwarding by the proxy device of the initial message to the second device.

9. The method of claim 1, wherein applying comprises allowing communications between the first device and the second device without decryption of messages by the proxy device.

10. The method of claim 1, wherein applying comprises comparing the identification information with stored information and applying a policy to permit access to the second device and/or to decrypt communications between the first device and second device based on the comparing, wherein the stored information represents host names for devices whose traffic is allowed to be intercepted and decrypted, categories of hosts, reputations of hosts and/or application types associated with hosts.

11. An apparatus comprising:
    at least one network interface unit configured to transmit and receive messages over a network;
    a memory;
    a processor coupled to the memory and the at least one network interface, wherein the processor is configured to:
        intercept a partially encrypted initial message of a handshaking procedure for a secure encrypted communication session between a first device and a second device, wherein the initial message is a ClientHello message of a Transport Layer Security (TLS) handshaking procedure that includes identification information associated with the second device, wherein the identification information comprises a plurality of parameters including host names, categories of hosts, reputations of hosts, and application types, and wherein each parameter has assigned a weight;
        extract from the initial message the identification information associated with the second device;

compare the plurality of parameters with a plurality of databases to generate comparison results;

balance the comparison results based on the assigned weights to the parameters to determine a policy; and apply the policy to communications between the first device and the second device based on the identification information, wherein the processor is configured to extract a server name indication extension in the initial message without decrypting the initial, and wherein the server name indication extension indicates a host name of the second device.

12. The apparatus of claim 11, wherein the memory is further configured to store information of devices for which communications are to be blocked, and wherein the processor is further configured to block the secure communication session between the first device and second device when there is a match between the identification information and the stored information.

13. The apparatus of claim 11, wherein the processor is configured to compare the identification information with stored information representing host names for devices whose traffic is allowed to be intercepted and decrypted, categories of hosts, reputations of hosts and/or application types associated with hosts, and apply a policy to permit access to the second device and/or to decrypt communications between the first device and second device based on the comparing.

14. A non-transitory computer readable tangible storage media encoded with instructions that, when executed by a processor, cause the processor to:

intercept at a proxy device a partially encrypted initial message of a handshaking procedure for a secure encrypted communication session between a first device and a second device, wherein the initial message is a ClientHello message of a Transport Layer Security (TLS) handshaking procedure that includes identification information associated with the second device, wherein the identification information comprises a plurality of parameters including host names, categories of hosts, reputations of hosts, and application types, and wherein each parameter has assigned a weight;

extract from the initial message the identification information associated with the second device;

compare the plurality of parameters with a plurality of databases to generate comparison results;

balance the comparison results based on the assigned weights to the parameters to determine a policy; and apply the policy to communications between the first device and the second device based on the identification information, wherein the instructions that cause the processor to extract comprise instructions that cause the processor to extract a server name indication extension in the initial message without decrypting the initial message, and wherein the server name indication extension indicates a host name of the second device.

15. The non-transitory computer readable tangible storage media of claim 14, wherein the instructions that cause the processor to apply comprise instructions that cause the processor to block the secure communication session between the first device and second device when there is a match between the identification information and stored information of devices for which communications are to be blocked.

16. The non-transitory computer readable tangible storage media of claim 14, wherein the instructions that cause the processor to apply comprise instructions that cause the processor to compare the identification information with stored information and apply a policy to permit access to the second device and/or to decrypt communications between the first device and second device based on comparison of the identification information to stored information representing host names for devices whose traffic is allowed to be intercepted and decrypted, categories of hosts, reputations of hosts and/or application types associated with hosts.

* * * * *